Nov. 17, 1931.   A. E. W. JOHNSON   1,832,027
TRACTOR DISK HARROW
Filed Nov. 6, 1930   3 Sheets-Sheet 1

Inventor
A. E. W. Johnson
By   Atty.

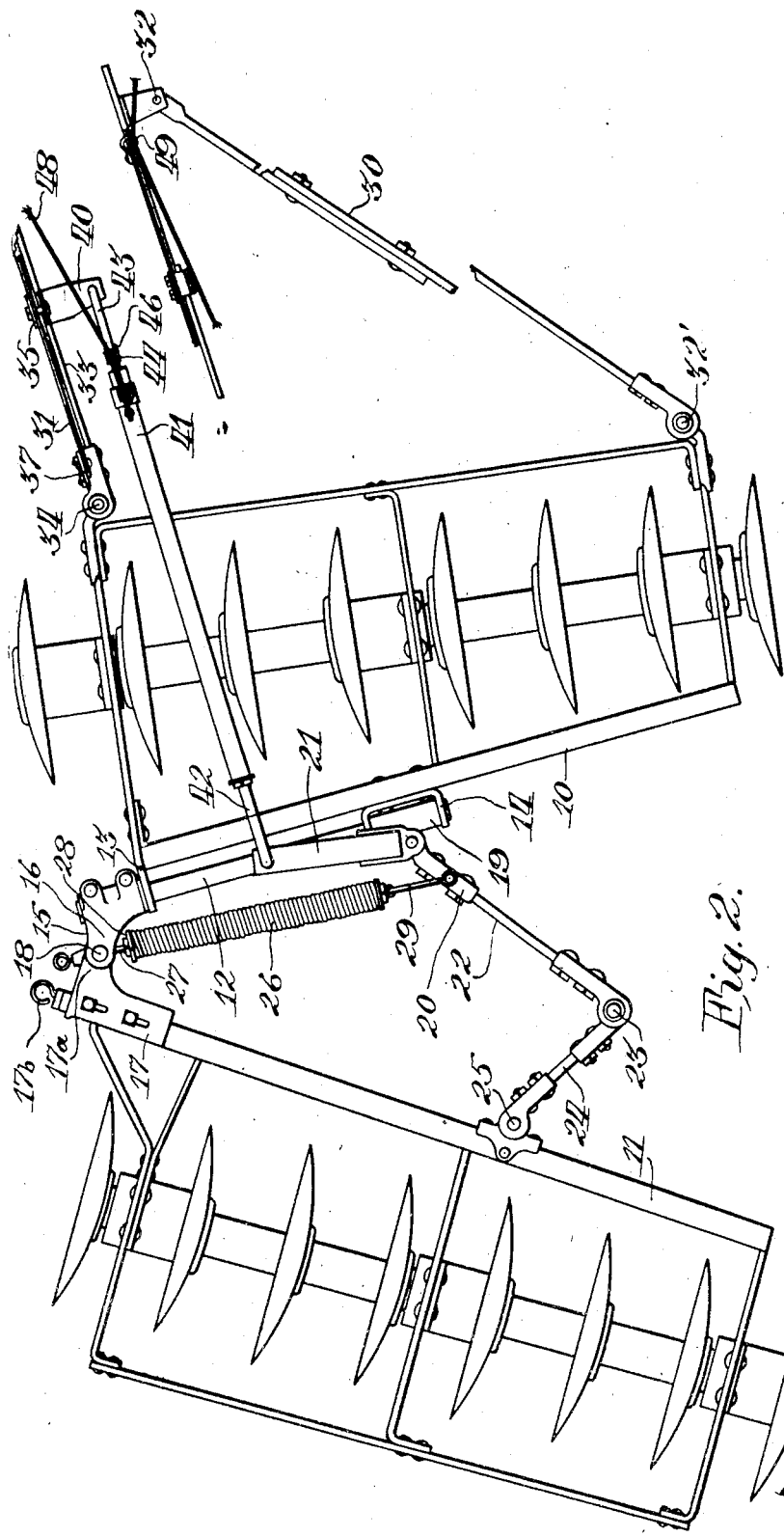

Nov. 17, 1931.  A. E. W. JOHNSON  1,832,027
TRACTOR DISK HARROW
Filed Nov. 6, 1930  3 Sheets-Sheet 3
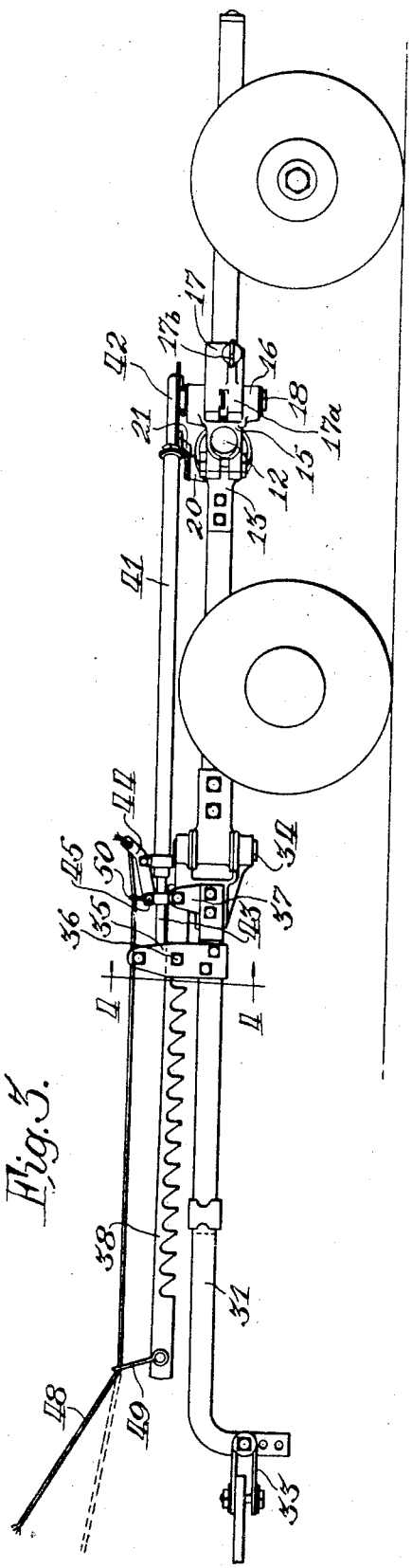
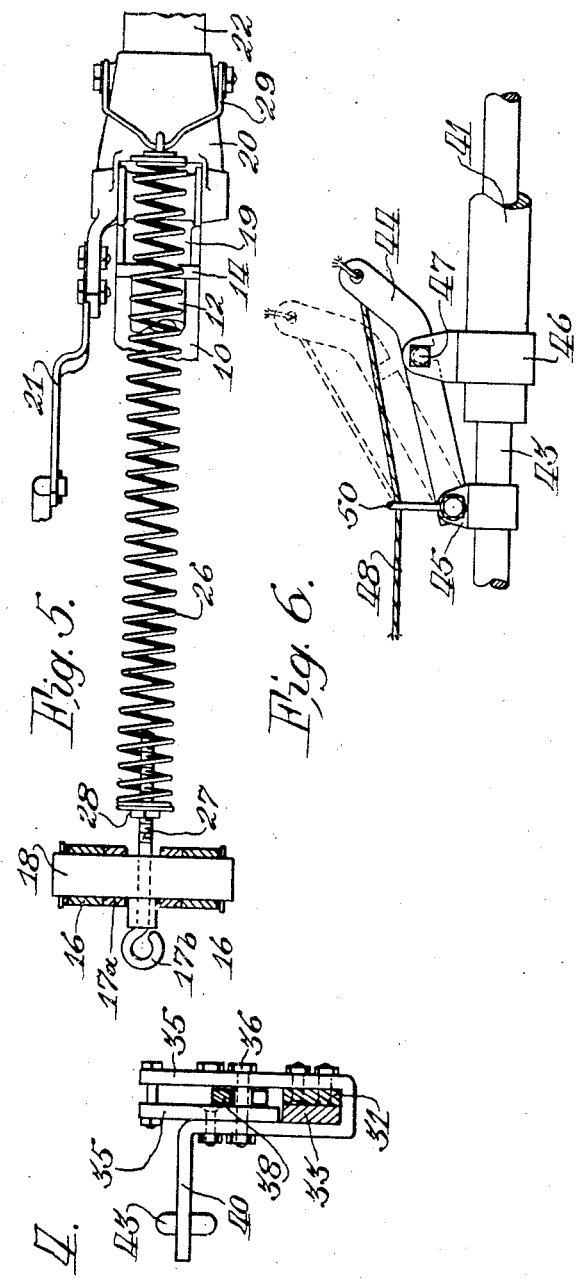
Inventor
A. E. W. Johnson Patented Nov. 17, 1931

1,832,027

UNITED STATES PATENT OFFICE

ARNOLD E. W. JOHNSON, OF CHICAGO, ILLINOIS, ASSIGNOR TO INTERNATIONAL HARVESTER COMPANY, A CORPORATION OF NEW JERSEY

TRACTOR DISK HARROW

Application filed November 6, 1930. Serial No. 493,738.

The present invention relates to tractor disk harrows of the tandem two-gang type adapted to be operated in laterally offset position with respect to the tractor.

The objects of the invention are to improve the action of such harrows by providing means in the construction whereby movement of the gang frames from parallel to angular relation, heretofore left to be effected by soil resistance as the harrow moves over the ground, will be assisted by a yielding force normally acting to swing the gang frames apart, but permitting the frames to close, or assume a parallel position on a turn to the right. Also, to provide a harrow of the type stated in which the yielding means tending to swing the gang frames apart will cause the maximum angle between the frames, permitted by the connections, to be assumed without respect to the angle limit obtainable through soil resistance alone. A further object is to provide a simple form of pivotal connection between the frames having movements about both a vertical and a transverse axis while holding the frames at the same level. Still another object is to provide a novel form of angling means including latch controlled members for effecting the angular adjustment of the gangs and for permitting movement from and to the angular set as the harrow is turned about.

The foregoing and other minor objects and advantages are accomplished in the preferred embodiment of the invention hereinafter described and illustrated in the accompanying drawings, where:

Figure 2 is a similar view with the parts in the positions assumed when the gangs are in angled or working position;

Figure 3 is a side elevation of the harrow shown in Figure 1;

Figure 4 is a detail, sectional view of the latch mechanism for controlling the gang angle, as viewed on the line 4—4 in Figure 3;

Figure 5 is a detail of the spring device for assisting movement of the gangs towards angular relation, as viewed on the line 5—5 in Figure 1; and, Figure 6 is a detail view of the trip control latch for locking and releasing a telescoping link forming part of the gang angling mechanism.

Figure 1:
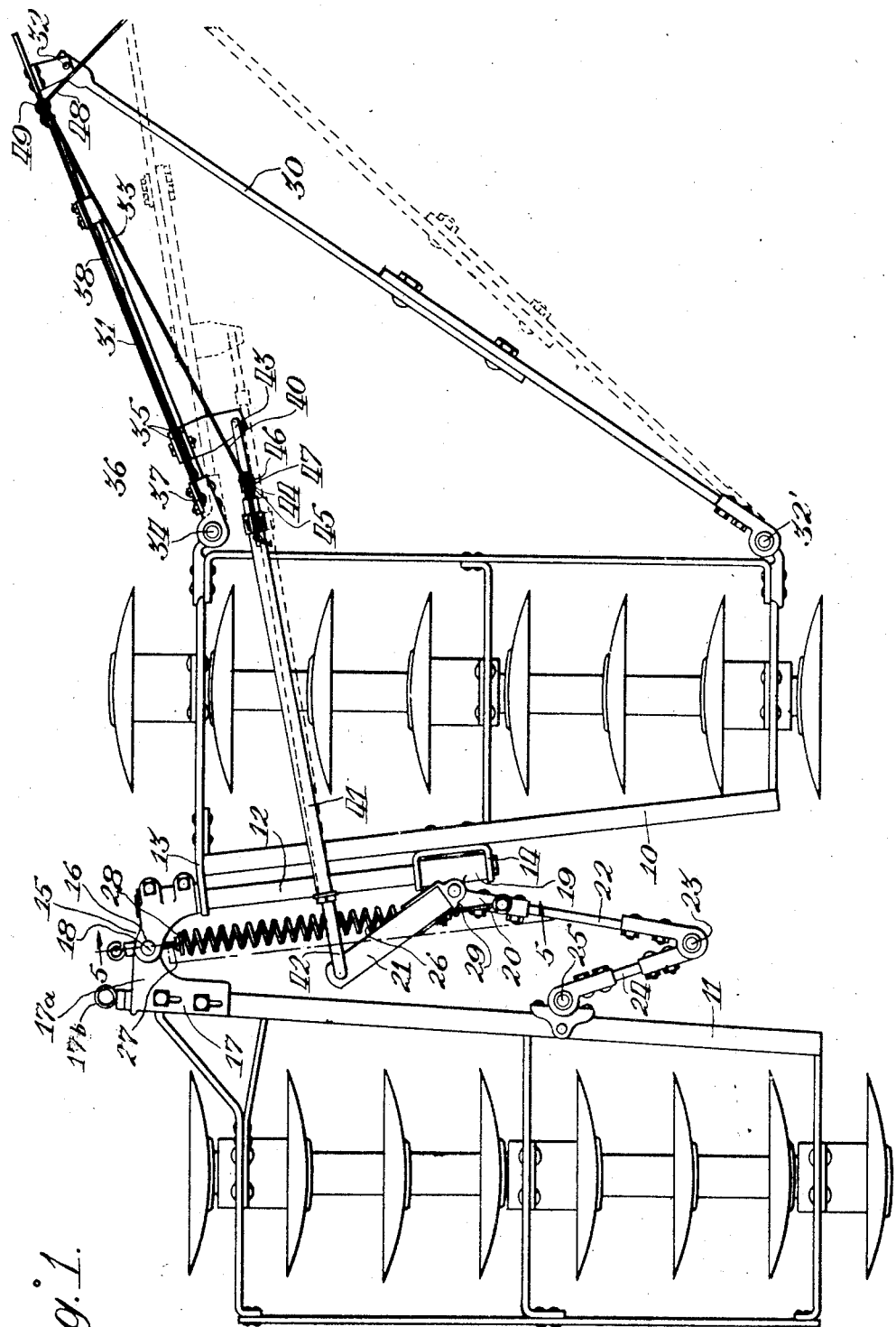
Figure 1 is a plan view of a tractor disk harrow embodying the invention with parts shown in the positions assumed when the gangs are in parallel or closed position for transport.

In the present instance, the invention is disclosed as applied to a tractor disk harrow comprising a pair of disk gang frames 10 and 11, which are preferably of oblong, rectangular form and arranged in tandem relation with the longer diameters of the frames extending transversely to the direction of travel. Each frame carries a series or gang of disks and the disk gangs in the respective frames have their concave sides directed in opposite directions.

In the present invention, the frames are connected for horizontal angular adjustment and also for movement about a transverse axis, by means of a transverse shaft 12, which is journaled in bearing members or brackets 13 and 14 secured to the rear side of the front frame. The shaft 12 preferably projects beyond one end of the front frame, as shown in Figures 1 and 2, and extends approximately to the middle of that frame. The projecting end of the shaft 12 has a rearwardly projecting, forked pivot bracket 15 clamped to it, which has upper and lower, rearwardly projecting, apertured lugs 16, as seen in Figure 3. The front bar of the rear gang frame 11 extends beyond one end of the frame, like the shaft 12 on the front frame, and this extended end is adjustably clamped in a pivot bracket 17, which has a forwardly projecting, apertured lug 17ª received between the lugs 16 of the bracket 15. A pivot pin 18 connects these parts and a threaded rod 17ᵇ connects the bracket 17 with the frame 11 and serves to adjust the frame on the bracket. A pivot pin 18 provides for movement of the gang frames about a vertical pivot at one end of the frames, and the pivot shaft 12 provides for up and down movement of the frames with respect to each other about the axis of the shaft 12.

In order to effect the desired angular movement or adjustment of the disk gang frames, the inner end of the shaft 12 has secured to it a sleeve-like member 19, which is provided with a vertical pin on which there is pivoted a lever 20. This lever is pivoted on the member 19 at its center and is provided with oppositely extending arms 21 and 22 with the arm 21 extending in the direction of the pivot between the gang frames. The arm 22 is pivotally connected at 23 to a link 24, which in turn is pivoted to the rear frame at 25, as illustrated in Figures 1 and 2. The link 24 and arm 22 of the lever 20 together form a toggle-like connection between the gang frames which acts on the respective frames at points spaced laterally from the pivot 18 between the frames. Extension of the toggle will force the frames into angular relation, and contraction of the toggle will bring them into parallel relation. In order to provide means for normally tending to extend the toggle described and thus normally force the frames towards angular relation, there is provided a tension spring 26, which is connected at one end to the pivot pin 18 which joins the gang frames, and, at its opposite end, to the arm 22 of the lever 20. This spring is preferably connected to the pin 18 by means of a swivel bolt 27 passing through the pivot pin 18 and formed with a screw threaded portion carrying a collar 28, to which the spring 26 is secured. Turning of the bolt 27 will serve to adjust the tension of the spring. The opposite end of the spring 26 is secured to a bail member 29, the arms of which are pivoted on the arm 22 of the lever 20.

To effect angling and straightening of the disk gangs as desired, the front gang frame carries draft means which preferably consists of converging draft members 30 and 31, which are pivotally connected at their converging ends at 32, forward of which point there is provided the usual clevis 33 for connection to the draft bar of a tractor. The draft bar 30 is preferably made in two overlapped adjustable parts, which are bolted together, as shown, and supported on a vertical pivot 32 on one end of the front frame. The other bar 31 is slidably mounted on a bar 33, which is pivoted at 34 to the end of the front gang frame opposite from the pivot point 32'. The bar 31 is held in position on bar 33 by suitable slides or sleeves, one of which is secured to the rear end of bar 31, as illustrated in Figure 4, and formed to provide parallel, upstanding arms 35 connected at a point above the bars 31 and 33 by a transverse pin or bolt 36. The supporting or non-movable bar 33 is provided with an upstanding lug 37 just forward of the pivot 34, and this lug serves as the point of pivotal connection for a forwardly extending ratchet bar 38 located just above the draft bar 31 and provided with ratchet teeth in its lower edge adapted to engage the transverse bolt 36 to lock the draft bar 31 against forward sliding movement. The inner arm 35 carrying the latch bolt 36 is provided with an inwardly extending horizontal arm 40 having an opening at its end pivotally receiving the forward end of a telescoping link connecting said arm 40 with the end of the arm 21 of lever 20.

The telescoping link is preferably formed of an outer tubular portion 41 secured to a terminal rod piece 42, which is in turn pivoted in an opening in the end of the lever arm 21, and an inner telescoping member 43, which slides into the tubular member 41. The members 41 and 43 are connected by a trip control latch comprising a latch arm or trip 44 pivoted between lugs 45 fixed on the projecting end of the link member 43 and a complemental member 46 secured to the tubular member 41 and provided with a transverse pin 47 adapted to be engaged by a notch in the lower edge of the latch member 44. When the trip or latch 44 is engaged with the pin 47, the telescopic link will be locked against extension, while release of the latch will permit members 41 and 43 of the link to extend. The rack bar 38, controlling the sliding movement of the draft member 31, is controlled by a pull rope 48, which passes through a bail-like member 49 on the front end of the rack member 38, and, after passing through a guide eye 50 above the lugs 45, is connected at its end to the upper end of the latch member 44. By this arrangement, the operator from his station on the tractor can control either latch bar 38 or the trip latch 44 by the same rope. By raising the rope to the angle shown in full lines in Figure 3, the ratchet bar 38 can be raised to release the sliding bar 31 without affecting the latch member 44, but, if a substantially direct pull is applied to the rope, as for instance in the direction indicated in dotted lines of Figure 3, the latch 44 may be released without affecting the ratchet bar 38.

In the operation of the harrow, the parts will first be in the positions shown in full lines in Figure 1. When it is desired to throw the gangs into angular relation, a pull on the rope 48 in such a manner as to lift the ratchet bar 38 will free the draft member 31, which will move forward under the draft power of the tractor, swinging the draft frame on the pivot 32 and carrying with it the locked telescoping link. The pull on this link will swing the lever 30 in such a manner as to extend the toggle formed by the link 24 and arm 22 of the lever, as the draft members and the link assume the dotted line position of Figure 1, and the gangs, the positions shown in Figure 2. The pull of spring 26 will assist the movement of the gangs into angular relation and also will assure that the full angle permitted by the connections is assumed. When it is desired to effect a right turn of the harrow, the operator will manipulate the rope 48 to release the latch 44, after which, on turning the harrow to the right, the parts 41, 43 of the telescoping link will extend, permitting the lever 20 to swing and the gangs to assume a parallel or nearly parallel position, as described, during a right turn. When straight forward travel is resumed, the gangs, under the influence of spring 26, will return to the angular relation originally set by forward movement of the draft member 31, and the latch member 44 will automatically re-engage the pin 47 and again lock the telescoping link.

The foregoing describes the preferred embodiment of the invention, which may, however, be subject to modification within the scope of the following claims.

What is claimed is:

1. A tractor disk harrow comprising a pair of disk-gang frames disposed in tandem relation, means pivotally connecting the frames for horizontal angular adjustment, and means for effecting horizontal angular adjustment of the frames on said pivotal connection including means carried by the frames for yieldably forcing them into angular relation.

2. A tractor disk harrow comprising a pair of disk-gang frames disposed in tandem relation, means pivotally connecting the frames for movement horizontally from parallel to angular positions, and yielding means supported on the frames for forcing them towards angular position but allowing them to move towards parallel position when the harrow is being turned.

3. A tractor disk harrow comprising a pair of disk-gang frames disposed in tandem relation, means pivotally connecting the frames for movement horizontally from parallel to angular positions, and angle adjusting means connecting the frames including a spring acting to force the frames towards angled position but yielding to allow the frames to move towards parallel position when the harrow is being turned.

4. A tractor disk harrow comprising a pair of disk-gang frames disposed in tandem relation, means pivotally connecting the frames for relative angular movement horizontally, a toggle link connection between the frames spaced laterally from said pivotal connection, resilient means tending to extend said toggle connection, and means carried by the forward frame for contracting said toggle connection against the action of said resilient means.

5. A tractor disk harrow comprising a pair of disk-gang frames disposed in tandem relation, means pivotally connecting the frames at one end for relative angular movement horizontally, a toggle link connection between the frames substantially midway between the ends of the frames, a tension spring connecting one link of the toggle with one of the frames and tending to extend the toggle, and means carried by the forward frame for contracting said toggle connection against the action of said spring.

6. A tractor disk harrow comprising a pair of disk-gang frames disposed in tandem relation, means pivotally connecting the frames for relative angular movement horizontally, a spring impelled connection between the frames normally tending to swing the frames apart on said pivotal connection, and means for swinging the frames towards each other against the action of said spring impelled connection.

7. A tractor disk harrow comprising a pair of disk-gang frames disposed in tandem relation, connecting means between the frames comprising a transversely extending bar between the frames journaled in spaced brackets extending from one of the frames and a vertical pivotal connection between said bar and the other frame, expansible and contractible connecting means between the frames connected thereto at points spaced laterally from the vertical pivotal connection, and means carried by the forward implement frame for actuating said last mentioned connecting means to angularly adjust the frames on the vertical pivotal connection.

8. A tractor disk harrow comprising a pair of disk-gang frames disposed in tandem relation, connecting means between the frames comprising a transversely extending bar journaled in spaced brackets extending rearwardly from the forward frame and a vertical pivotal connection between said bar and the rear frame, a toggle link connection between said bar and the rear frame spaced laterally from the vertical pivotal connection, and means carried by the forward implement frame for opening and closing the toggle connection to angularly adjust the frames on the vertical pivotal connection.

9. A tractor disk harrow comprising a pair of disk-gang frames disposed in tandem relation, connecting means between the frames comprising a transversely extending bar journaled in spaced brackets extending rearwardly from the forward frame and a vertical pivotal connection between said bar and the rear frame, a toggle link connection between said bar and the rear frame spaced laterally from the vertical pivotal connection, a tension spring connecting the vertical pivotal connection with one link of the toggle, and means carried by the forward implement frame for opening and closing the toggle connection to angularly adjust the frames on the vertical pivotal connection.

10. A tractor disk harrow comprising a pair of disk-gang frames disposed in tandem relation, means pivotally connecting the frames for horizontal angular adjustment, and draft actuated means for effecting angular adjustment of the frames on said pivotal connection comprising a pair of forwardly converging draft members one of which is pivotally connected to one end of the forward frame and the second supported on the other end of said frame for movement in a fore and aft direction, a connection between the rear frame and said second draft member including a telescoping link, means for controlling fore and aft movement of said second draft member, and means for controlling telescoping movement of said link.

11. A tractor disk harrow comprising a pair of disk-gang frames disposed in tandem relation, means pivotally connecting the frames for horizontal angular adjustment, and draft actuated means for effecting angular adjustment of the frames on said pivotal connection comprising a draft member mounted on the forward frame for fore and aft movement, latch mechanism for controlling movement of the draft member, a lever pivoted on the forward frame on a vertical axis, a link pivoted to one arm of said lever and to the rear frame, a telescoping link connecting the other arm of said lever and the draft member, latch mechanism controlling telescoping movement of the link, and a single actuating element for independently controlling both said latch mechanisms.

12. A tractor disk harrow comprising a pair of disk-gang frames disposed in tandem relation, means pivotally connecting the frames at one end thereof for horizontal angular adjustment, a lever pivoted intermediate its ends on a vertical pivot on the front frame, draft means connected to the front frame including a latch controlled slidably supported member movable forward and backward with respect to the front frame, a link comprising telescopically related parts connecting said member with one arm of said lever, a pivotal link connection between the other arm of the lever and the rear gang frame, whereby forward movement of said slidable member will force the gang frames from parallel to angular relation, and trip controlled latch mechanism for locking and releasing the telescoping link parts whereby angular movement of the gang frames from angular to parallel relation may take place without movement of the slidable member.

In testimony whereof I affix my signature.

ARNOLD E. W. JOHNSON.